No. 739,176. Patented September 15, 1903.

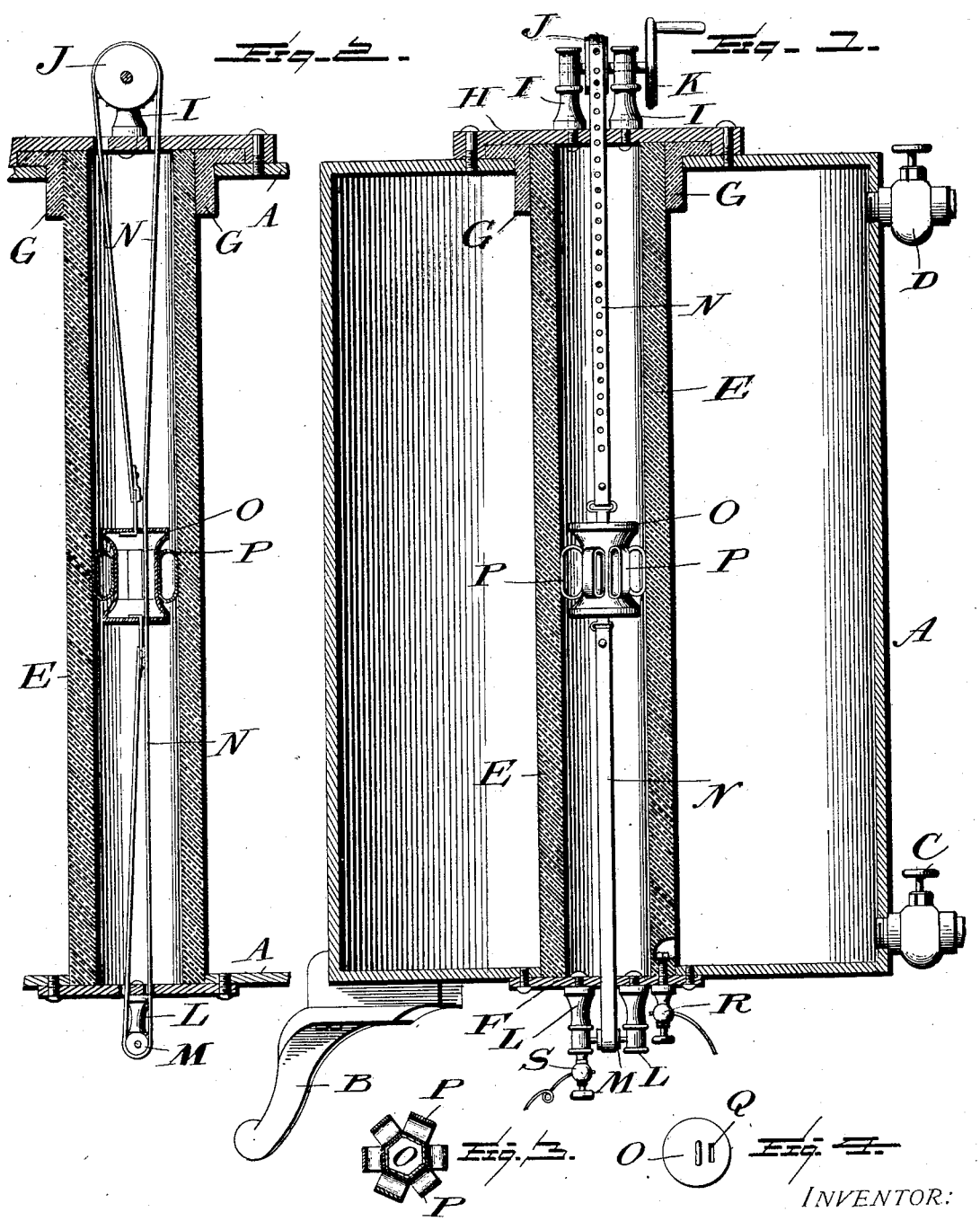

UNITED STATES PATENT OFFICE.

WILLIAM E. HEAL, OF MARION, INDIANA.

ELECTRIC WATER-HEATER.

SPECIFICATION forming part of Letters Patent No. 739,176, dated September 15, 1903.

Application filed March 29, 1900. Serial No. 10,677. (No model.)

*To all whom it may concern:*

Be it known that I, WILLIAM E. HEAL, a citizen of the United States, residing at Marion, in the county of Grant and State of Indiana, have invented certain new and useful Improvements in Electric Water-Heaters; and I do hereby declare the following to be a full, clear, and exact description of the invention, such as will enable others skilled in the art to which it appertains to make and use the same.

My invention relates to certain new and useful improvements in electric water-heaters, and is designed for heating from a central power-station of public or private buildings by hot-water radiation. This is accomplished not as is usally done by heating the water at a central station and distributing same through pipes underground to the buildings to be heated, but by generating electricity at the central station or stations and distributing the same to the local and separated points over wires carried either by poles overhead or in conduits under the ground. At the building to be heated the electric current is caused to pass through a suitable resistance by which heat is generated and caused to raise the temperature of a body of surrounding water, which is circulated throughout the building by means of suitable pipes and radiators and eventually returned to the heater. This heater consists of a metallic tank containing the resistance through which the electric current flows and which resistance is surrounded by water to be heated therefrom. As the water is heated it rises and passes out through the outlet of the tank and is replaced by cooler water flowing in at the bottom, thus maintaining a continuous circulatory system.

The object of my invention is to enable the distribution of heat at considerable distances from a central station without the losses incident to the transmission of heated water through pipes.

A further object is to provide a heater for a system of this nature which will be adapted to regulate the amount of heat generated by means of adjusting the amount of resistance introduced in the electric circuit. This may be done in a number of different ways; but the preferred form of device, which is set forth in this application, consists of a cylindrical tank with an upper and lower valve connection with a distributing system and a carbon cylinder located centrally therein and adapted to be in direct contact with the contents of the tank. The carbon cylinder is closed at its lower end by an insulating supporting-plate, to which is attached a binding-post in electrical connection with the lower end of the carbon cylinder and forming one terminal of the device. The upper end of the carbon cylinder is insulated from the tank and is provided with an insulating-cover, on which is mounted a suitably-operated sprocket-wheel engaging a perforated ribbon of steel or other conducting material, which passes through the carbon cylinder, being mounted on a pulley on the supporting-plate and having its ends connected to a movable piston consisting of a sheet-metal body provided with radial contact-springs adapted to maintain electrical connection between the piston and carbon cylinder at all times. A second binding-post is in electrical connection with the above-mentioned pulley and forms the other terminal of the device. The carbon cylinder being included in the electric circuit and adapted to have its sliding contact introduce more or less of its body to the action of the current, it is obvious that its resistance to the passage of said current varies directly in proportion to the distance between the bottom of the cylinder and the piston, and the heat developed by the introduction of such resistance will vary accordingly. So it will be seen that the temperature of the water contained in the surrounding tank and the pipe system connected therewith may be regulated as desired by adjusting the position of the piston within the carbon cylinder by means of the sprocket-wheel and ribbon attachment.

With the above and other objects in view my invention further consists in the novel details of construction and combination of parts to be clearly described in the following specification and fully set forth in the claims.

Referring to the accompanying drawings, forming part of this application, Figure 1 is a central vertical sectional view of my improved water-heater. Fig. 2 is a similar view of the carbon cylinder and attachments taken on a plane at right angles to that of Fig. 1. Fig. 3 is a horizontal central sectional view of the piston, and Fig. 4 is a plan view of the piston end.

In the drawings, A indicates a cylindrical metallic water-tank, which is suitably supported on legs B and provided with the lower inlet-valve connection C and the upper outlet-valve connection D, which lead to and from an ordinary hot-water heating system. (Not shown.) A hollow carbon cylinder E extends centrally through the tank A and is supported at its lower end by the supporting-plate F, of vulcanized fiber or other insulating material, which is secured to the bottom of tank A. The upper end of the carbon cylinder E is insulated from the tank A by means of the bushing G, preferably of porcelain, and is provided with the cap H, of vulcanized fiber or other insulating material, which is secured to the top of the tank A. A pair of standards I I are mounted on the cap H and have journaled therein a sprocket-wheel J, on the shaft of which is mounted a hand-wheel K, and a similar pair of standards L L depend from the supporting-plate F and have mounted therebetween the idle pulley M. A metallic ribbon N, preferably of spring-steel, is provided with a series of perforations for engaging with the teeth of the sprocket-wheel J and extends through openings in the cap H and supporting-plate F, where it is mounted on the pulley M and has its two ends connected to a piston O, consisting of a sheet-metal cylinder with a contracted central portion forming a spool-shape structure with its central part hexagonal in cross-section, as shown in Fig. 3. Oval contact-springs are riveted or otherwise secured to the flat surfaces of the central portion of the piston and are adapted to bear with a spring-pressure on the inner surface of the carbon cylinder, and thus maintain electrical connection between said cylinder and the piston at all times. The ends of the ribbon N are connected to the centers of the piston ends to prevent a tilting of the piston, and the continuous portion of the ribbon, extending from the sprocket-wheel to the idle pulley, passes through suitable openings Q in the ends of the piston, through which it is free to slide.

A binding-post R depends from the supporting-plate F and is in electrical connection with the lower end of the carbon cylinder E, forming one terminal of the device, while a binding-post S is formed in connection with one of the standards L and forms the other terminal of the device. The current enters by the binding-post S, passes through the pulley M and ribbon N to the piston O, whence it is conveyed by the contact-springs P to the carbon cylinder E and is caused to traverse as much of said carbon cylinder as lies between the piston and the bottom of the tank, where the current passes out through binding-posts R. The heat generated by the passage of the electric current through the resistance of the carbon cylinder is imparted to the surrounding water in the tank A, which then rises and flows out through the outlet D, being replaced by an inflow of returned cool water through inlet C. The amount of heat being generated may be increased or decreased by raising or lowering the piston by means of the hand-wheel K, and thus the device is subject to regulation which is entirely under control of the operator.

It is obvious that many changes and alterations may be made in the exact details of construction and arrangement of parts set forth herein without departing from the spirit and scope of my invention and, further, that the heater herein described is not limited to the specific use stated, but is capable of many other purposes, such as an independent heat-radiator without a water-circulating system or any other of numerous devices employing a self-contained heating means.

Having fully described my invention, what I claim as new, and desire to secure by Letters Patent, is—

1. In a device of the character described, a cylinder of poor conducting material, a connector therefor, a piston with radial spring-pressed contact devices slidable within the cylinder and adjustable with relation to the connector, and a tank surrounding the cylinder, substantially as described.

2. In a device of the character described, a cylinder of poor conducting material, a connector therefor, a slidable contact device located within the cylinder, a conducting-ribbon extending through the cylinder and connected to the contact device, means for moving the ribbon, and a tank surrounding the cylinder, substantially as described.

3. In a device of the character described, a carbon cylinder, a supporting-plate of insulating material covering the lower end thereof, a connector on the supporting-plate in electrical connection with the cylinder, a tank surrounding the cylinder and secured to the supporting-plate, means for insulating the upper end of the cylinder from the tank, a cap of insulating material covering the upper end of the cylinder, a sheet-metal piston, radial contact-springs connected thereto and bearing on the inner walls of the cylinder, standards mounted on the cap and supporting-plate respectively, a pulley journaled in the standards of the supporting-plate, a hand-operated sprocket-wheel mounted in the standards of the cap, a ribbon of conducting material connected to the piston and passing around the pulley and sprocket-wheel and provided with perforations for engaging the teeth of the sprocket-wheel, and a connector in electrical connection with the pulley, substantially as described.

In testimony whereof I affix my signature in presence of two witnesses.

WILLIAM E. HEAL.

Witnesses:
WILLIAM H. CARROLL,
GRIFFITH D. DEAN.